April 3, 1928.
H. O. ROESKE
HOUSEHOLD TWINE REEL
Filed April 28, 1927
1,664,467
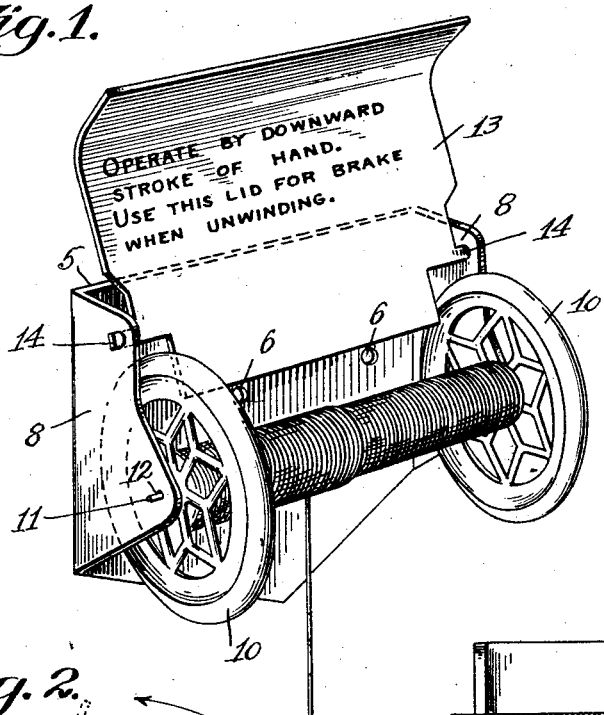
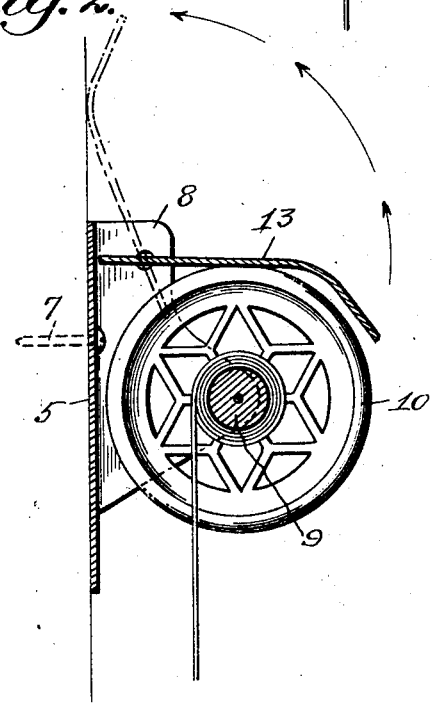
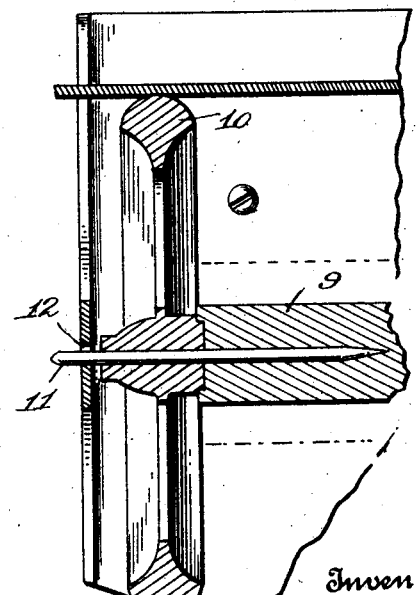

Patented Apr. 3, 1928.

1,664,467

UNITED STATES PATENT OFFICE.

HENRY O. ROESKE, OF BELFAST, NEW YORK.

HOUSEHOLD TWINE REEL.

Application filed April 28, 1927. Serial No. 187,143.

The object of this invention is to provide a simple reel for use in households, the construction being such that odd pieces of twine may by quickly wound upon the reel to thus store them in a place where they will be convenient for use when needed and will not be unsightly. A further object is to so construct the device that the twine may be unwound from the reel in such manner as to avoid unreeling more than is needed at the particular time, as more fully hereinafter set forth.

In the drawing—

Fig. 1 is a perspective view of my device;

Fig. 2 is a vertical sectional view thereof;

Fig. 3 is an enlarged detail section taken through one end of the reel.

Referring to the drawing annexed by reference-characters, 5 designates a wall-plate provided with holes 6 for the fastening-screws 7, this plate being provided with flanges 8 along its vertical edges for the support of the reel and the brake device.

The reel consists of a shaft 9 having affixed to each end a fly-wheel 10, a pintle 11 being provided at each end of the shaft to form journals for the reel, holes 12 being provided in the flanges for the reception of these journal-pintles. The use of fly-wheels as flanges for the reel enables the reel to be given a very rapid rotation by simply stroking one of the wheels on its perimeter with the hand, to thus wind up the twine on the reel quickly.

In view of the quick-running character of the reel, it is essential that means be provided for retarding the rotation when the twine is unwound from the reel in the usual manner by pulling on the free end of the twine, as otherwise a good deal more twine would be unwound than was needed. To provide for this retardation, I employ a brake-plate 13 which is provided with pintles 14 journalled in holes in the flanges 8, at a point about on a level with the top edges of the fly-wheels. These pintles are located near the rear edge of the brake-plate, so that the front edge of the brake-plate will tend to gravitate downwardly and therefore rest gravitatingly upon the top edges of the fly-wheels. The brake-plate is desirably bent downwardly at its forward edge to thus form a dust-cover for the reel. The holes for the pintles 14 are positioned in the flanges at a point forward of the wall-plate 5, so that, when the brake-plate is swung upwardly, it will gravitatingly rest against the adjacent wall, as shown in dotted lines in Fig. 2, or against the top edge of the wall-plate 5 in case the supporting wall-surface is not there. The brake-plate is thrown up to this non-use position while twine is being wound upon the reel, to thus free the reel from the brake action and permit it to be rapidly spun on its journal-pins.

It will be understood that by "fly-wheels" I mean wheels which are weighted in the rims as usual for the purpose of storing up power that will serve to continue the rotation of the reel after the impulse has been given to it by the finger or hand of the operator. It will be understood that in winding-up a length of twine, the operator simply connects one end to the reel and then spins the reel by giving it a downward stroke on the periphery of one of the wheels. In this way, the reel is given momentum which will keep it going a considerable length of time, which will be long enough to wind-up, without further attention on the part of the operator, a piece of string of considerable length. With this type of device, quick winding is absolutely essential, as housewives will not bother to save odd pieces of string unless the winding can be done with practically no trouble. This free-running reel necessitates the use of a brake, as otherwise in unreeling the twine the momentum given to the wheel would unwind in most cases a good deal more string than was desired. The brake I have designed is automatic except when the brake-plate is thrown upwardly and backwardly to rest position, the reel is free for spinning action.

What I claim as new is:

1. In a household twine-reel, a bracket-plate, a reel journalled therein and consisting of a shaft or drum provided with a pair of fly-wheels, one at each end, journals supported on the bracket, and a gravitating brake-plate pivotally mounted on the bracket and resting gravitatingly upon the top edges of the fly-wheels, the pivots for this brake-plate being so located that the plate may be swung upwardly and backwardly to a position to rest out of braking action.

2. A household twine-reel consisting of a supporting bracket, a reel journalled freely in said bracket and carrying a fly-wheel, and a brake device mounted on the bracket and adapted to be shifted from braking position against said fly-wheel to a non-braking position, to thus free the reel for quick winding operations.

In testimony whereof I hereunto affix my signature.

HENRY O. ROESKE.